Sept. 11, 1962 F. T. BACKERS ETAL 3,053,942

METHOD OF RECORDING AND/OR REPRODUCING HIGH-FREQUENCY SIGNALS

Filed March 30, 1959

INVENTORS
FRANCISCUS THEODORUS BACKERS
JOHANNES HENDRIK WESSELS
BY
Frank R. Jifani
AGENT United States Patent Office 3,053,942

Patented Sept. 11, 1962

3,053,942

METHOD OF RECORDING AND/OR REPRODUCING HIGH-FREQUENCY SIGNALS

Franciscus Theodorus Backers and Johannes Hendrik Wessels, both of Eindhoven, Netherlands, assignors to North American Philips Company, Inc., New York, N.Y., a corporation of Delaware Filed Mar. 30, 1959, Ser. No. 802,744
Claims priority, application Netherlands Apr. 12, 1958
3 Claims. (Cl. 179—100.2)

Figure 1:
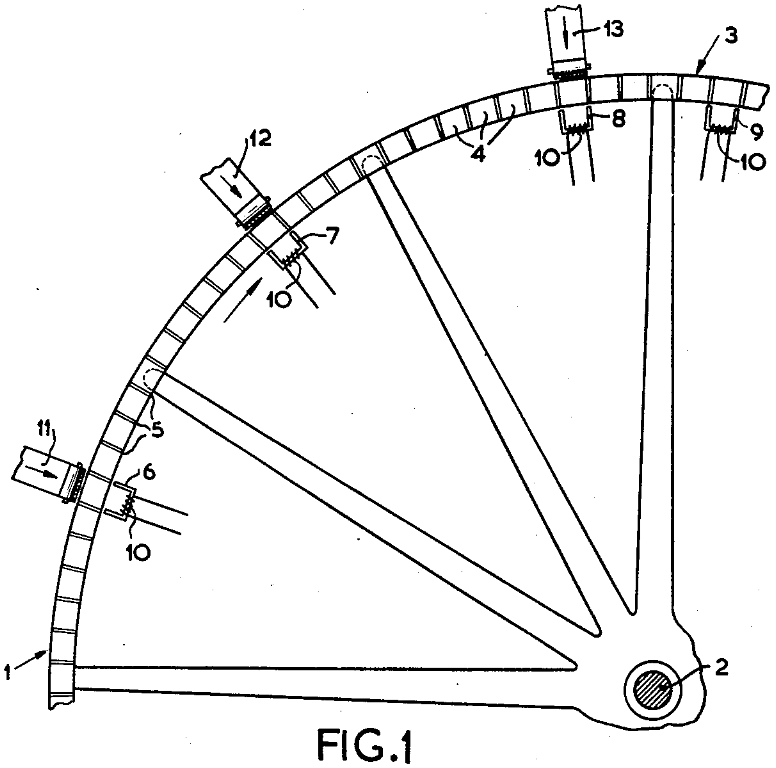

This invention relates to methods of recording and/or reproducing high-frequency signals, more particularly television signals, on a tape. The recording or reproducing is done by means of a rotating wheel containing a plurality of pairs of pole pieces and by means of a plurality of magnetic yokes for conducting the magnetic flux through the pole pieces towards or away from the tape; this arrangement allows that more than one yoke may be operative at the same time.

In a known method of this kind, the pairs of pole pieces and the magnetic yokes are combined as magnetic heads and as such arranged on the rotating wheel. The arrangement of the magnetic yokes on a rotating device has the disadvantage that special precautions have to be taken for the connection between the electrical energy supplying or receiving device, which is stationary, and the rotating windings of the magnetic yokes. In the known method this takes place by brushes or slip rings thus causing the occurrence of manifold undesired phenomena.

This disadvantage is avoided by the method according to the invention in that a plurality of fixed yokes is employed and magnetic tapes are moved along two or more of these yokes. This method permits the realization of several possibilities:

(1) This method is suitable more particularly for the simultaneous recording of the various programs of a plurality of equivalent television transmitters and also for the simultaneous transmission of a plurality of different television programs.

(2) The method is especially suited for simultaneously manufacturing a large number of copies, in the form of magnetic record carriers, of a television program, since it is fundamentally possible to manufacture as many copies as there are magnetic yokes, provided of course that the required number of magnetic carriers is available. As an example of this it is noted that for recording a television image divided into 625 lines, during which each image must be scanned 25 times per second a total of 625×25 lines must be recorded per second. If a wheel performing 7500 revolutions is employed for this recording, it is necessary to arrange 125 recording heads on the wheel. It would thus fundamentally be possible to obtain 125 copies simultaneously. This would mean in this case an enormous improvement in the efficiency with which the pole pieces are used during each revolution; an improvement in efficiency would also occur with a wheel having much fewer pole pieces, provided that this number is not less than two and all of the pole pieces are operative at the same time.

(3) A plurality of yokes may be used simultaneously for recording or reproducing associated partial color image records.

(4) Since synchronization is of prime importance in recording or reproducing a television program, it is possible to use, in addition to one or more of the yokes for image recording, one of the yokes for synchronizing the speed of revolution of the wheel with the speed of the magnetic carrier and/or the velocity of scanning an arbitrary signal, more particularly a television signal.

If the method is used for the reception and/or reproduction of color television, this may be effected by the use of groups of at least two yokes which simultaneously co-act with one magnetic carrier. The magnetic tape, as is known, per se, thus shows as a result of other methods a plurality of juxtaposed record tracks extending in the direction of length. Each two juxtaposed tracks are characterized by a relative location of the lines recorded thereon such that a line in the one track which is a prolongation of a line in the other track, corresponds as to its information to a line in the other track which is located before or after the line previously mentioned.

Said conformity may in this case consist in that the relevant lines in the various tracks represent the component colors of a certain section of the color image. Thus, when using three tracks, the left-hand track may contain the color signal having a bandwith up to 0.5 mc./s., the central track may contain the signal having a bandwidth up to 1.5 mc./s. and the right-hand track may contain the signal having a bandwidth up to 5 mc./s. When using two tracks it is alternatively possible for the signals having a bandwidth up to 0.5 mc./s. (the Q-signal) and those having a bandwidth up to 1.5 mc./s. (the I-signal) to be recorded in combination in one track, whilst the signal having a bandwidth up to 5 mc./s. (the Y-signal) is recorded in the other track.

The above-mentioned feature of recording in different tracks also exists if the nature of the information of two corresponding lines in juxtaposed tracks is wholly identical. This occurs if by means of the method according to the invention the information is copied in a plurality of identical tracks on a single carrier.

A novel device for carrying out the method according to the invention is characterized in that the yokes are stationary, and are arranged along the circumference of the wheel. Further a novel rotating wheel to be used in this device is characterized in that it is only provided with that part of the several magnetic heads to which the pole pieces and the yokes may be combined, which part includes the pair of pole pieces.

Figure 2:
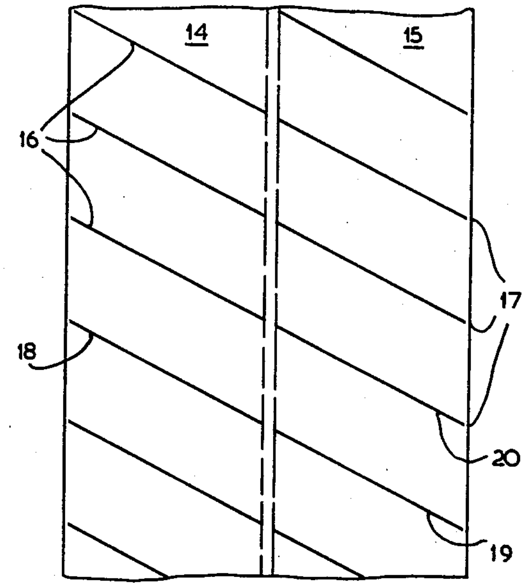

In order that the invention may be readily carried into effect, one embodiment will now be described in detail, by way of example, with reference to the accompanying drawings, in which FIGURE 1 shows a device comprising a wheel having a large number of pole pieces, the wheel rotating along a plurality of fixed yokes;

FIGURE 2 shows part of a plan view of a tape covered with a magnetic layer in which two tracks have been recorded by the use of the method according to the invention.

Referring now to FIG. 1, reference numeral 1 indicates a wheel which can rotate about a shaft 2. The wheel 1 has a rim 3 which accommodates a large number of pole pieces 4, a useful gap 5 being formed between each pair of pole pieces.

The plane perpendicular to the centre of the gaps is at right angles to the plane of drawing. A plurality of fixed yokes 6 to 9 provided with windings 10, are arranged along the inner circumference of the rim of wheel 1. A plurality of magnetic tapes 11 to 13 move externally of the rim along the magnetic yokes so that a record may be provided thereon in the transverse direction or a record already present thereon may be scanned.

In contra-distinction to devices of known type, in which during the rotation of the wheel on the average only one yoke is operative during each revolution of the wheel, in the device for carrying out the method according to the invention, the yokes are used more effectively. Thus, the turns of the yokes 6 to 8 may be connected at the same time to one source of information, so that by means of the tapes 11 to 13 three copies of this information source become available. Conversely, it is possible to scan at the same time a plurality of copies and supply the scanned signals through leads to a plurality of television relay transmitters, thus increasing the range of the central transmitter.

In a substantially similar manner it is possible for several programs of a plurality of equivalent transmitters to be recorded simultaneously by connecting the turns of the yokes 6 to 8 to different sources of information, whilst the reverse is likewise possible.

For the required synchronisation of the wheel with the magnetic tape and the television camera, use may be made, for example of the yoke 9.

If the I-signal, the Q-signal and the Y-signal are of a television image supplied to the turns of the yokes 6 to 8 respectively, the color television image is recorded on the tapes 11 to 13. It is, of course, simpler in this case to use three yokes placed side-by-side for this recording and to replace the three tapes themselves by one broad tape. It is alternatively possible to record colour television images by means of, for example, two yokes placed side-by-side, the brightness signal (the Y-signal) being supplied to the turns of the one yoke and the combination of the I-signal and the Q-signal being supplied to the turns of the other yoke. In the reverse case, it is possible with the same means to scan a color record already present on the tape or tapes and to transmit the scanned signal by means of a transmitter.

FIG. 2 shows a part of a tape on which a record is provided such as is obtained if two yokes are arranged side-by-side and the turns are connected to the same source of information or to different sources of information. Two tracks 14 and 15 which extend in the direction of the length of the tape, are thus obtained on the common magnetic tape.

If two yokes side-by-side are connected to the same information source, the lines 16 and 17 in the tracks 14 and 15 are relatively situated so that a line 18 in the track 14 is a prolongation of a line 19 in the track 15, line 18 corresponding as regards its information to the line 20 in the track 15, which is located before or after the line 19 in track 15.

What is claimed is:

1. Magnetic recording or reproducing apparatus comprising a rotating wheel having a rim, a plurality of fixed magnetic yokes located adjacent said rim, a plurality of magnetic pole pieces arranged on said rim, said pole pieces rotating with said wheel past said yokes, and a plurality of magnetic recording media moving relative to said rim and adjacent thereto.

2. In magnetic tape recording and reproducing apparatus employing a plurality of moving magnetic tapes, a rotating wheel having a rim, drive means for rotating said wheel past said tapes, a plurality of spaced magnetic pole pieces arranged on said rim, a plurality of fixed magnetic yokes located adjacent said rim, and an electrical winding coacting with each of said yokes.

3. Magnetic recording or reproducing apparatus comprising a rotating wheel having a rim, drive means for rotating said wheel, a plurality of fixed magnetic yokes located adjacent said rim, a plurality of spaced magnetic pole pieces arranged on said rim, said pole pieces moving past said yokes and magnetically coacting therewith, a plurality of magnetic tapes moving past said rim and coacting with said pole pieces, the plane of movement of said wheel being transverse to the plane of movement of said tapes, and an electrical winding coacting with each of said yokes.

References Cited in the file of this patent

UNITED STATES PATENTS

| | | |
|---|---|---|
| 1,941,618 | Nemirovsky | Jan. 2, 1934 |
| 2,585,291 | Wittel | Feb. 12, 1952 |
| 2,831,180 | Hasbrouck | Apr. 15, 1958 |
| 2,890,288 | Newman | June 9, 1959 |
| 2,909,616 | Marty | Oct. 20, 1959 |

FOREIGN PATENTS

| | | |
|---|---|---|
| 684,587 | Great Britain | Dec. 17, 1952 |
| 760,874 | Great Britain | Nov. 7, 1956 |